(12) United States Patent
Duan et al.

(10) Patent No.: US 11,794,388 B1
(45) Date of Patent: Oct. 24, 2023

(54) DUAL AREA BI-INJECTION MOLDING

(71) Applicant: Dell Products L.P., Round Rock, TX (US)

(72) Inventors: Yonghong Duan, Shanghai (CN); David William Grunow, Round Rock, TX (US); David Wheeler Williams, Salado, TX (US); Patrick A. Hampton, Round Rock, TX (US); Anthony Wayne Howard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/805,032

(22) Filed: Jun. 2, 2022

(51) Int. Cl.
| | |
|---|---|
| *B29C 45/13* | (2006.01) |
| *B29C 45/00* | (2006.01) |
| *B29C 45/14* | (2006.01) |
| *B29C 45/22* | (2006.01) |
| *B29K 307/04* | (2006.01) |
| *B29L 31/34* | (2006.01) |
| *B29K 309/08* | (2006.01) |

(52) U.S. Cl.
CPC .......... *B29C 45/13* (2013.01); *B29C 45/0001* (2013.01); *B29C 45/14* (2013.01); *B29C 45/22* (2013.01); *B29K 2307/04* (2013.01); *B29K 2309/08* (2013.01); *B29K 2995/0005* (2013.01); *B29L 2031/3481* (2013.01)

(58) Field of Classification Search
None
See application file for complete search history.

(56) References Cited

U.S. PATENT DOCUMENTS

| | | | |
|---|---|---|---|
| 2016/0198026 A1* | 7/2016 | Del Toro | H04B 1/3888 455/575.8 |
| 2019/0160718 A1* | 5/2019 | Bazzo | B29C 45/76 |

\* cited by examiner

*Primary Examiner* — Mohammad M Ameen
(74) *Attorney, Agent, or Firm* — McDermott Will & Emery LLP

(57) ABSTRACT

Forming a casing of an information handling system using dual area bi-injection, the method including injecting a first material into a mold: i) at first locations of the mold to form a first portion of a casing, and ii) at second locations of the mold to form a second portion of the casing; and injecting a second material into the mold at third locations of the mold to form a third portion of the casing; wherein injection of the first material and the second material into the mold is done concurrently, wherein injection of the first and the second material into the mold forms a first bonding interface and a second bonding interface between the first material and the second material such that the second material is excluded from ingression to the first portion and the second portion of the casing.

11 Claims, 10 Drawing Sheets

DUAL AREA BI-INJECTION MOLDING

BACKGROUND

Field of the Disclosure

The disclosure relates generally to dual area bi-injection molding, and in particular, dual area bi-injection molding for forming a casing of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of forming a casing of an information handling system using dual area bi-injection, the method including injecting a first material into a mold: i) at one or more first locations of the mold to form a first portion of a casing of an information handling system, the first portion extending from a first side of the casing at least first distance, and ii) at one or more second locations of the mold to form a second portion of the casing of the information handling system, the second portion extending from a second side of the casing at least a second distance, the first side opposite to the second side; and injecting a second material into the mold at one or more third locations of the mold to form a third portion of the casing of the information handling system, the third portion between the first portion and the second portion; wherein injection of the first material and the second material into the mold is done concurrently, wherein injection of the first and the second material into the mold forms a first bonding interface and a second bonding interface between the first material and the second material such that the second material is excluded from ingression to the first portion and the second portion of the casing.

Other embodiments of these aspects include corresponding systems and apparatuses.

These and other embodiments may each optionally include one or more of the following features. For instance, the first portion of the casing is in superimposition with a first antenna, and the second portion of the casing is in superimposition with a second antenna. The first material is non-conductive and the second material is conductive. The first material is glass fiber reinforced plastic and the second material is carbon fiber reinforced plastic. The first portion of the casing forms a first antenna window for the first antenna, and the second portion of the casing forms a second antenna window for the second antenna. A boundary of the first antenna is a third distance from the first side, wherein the first distance is greater than the third distance, and wherein a boundary of the second antenna is a fourth distance from the second side, wherein the second distance is greater than the fourth distance. The first bonding interface is defined between the first portion of the casing and the third portion of the casing, the first bonding interface including a composite of the first and the second materials, and wherein the second bonding interface is defined between the second portion of the casing and the third portion of the casing, the second bonding interface including a composite of the first and the second materials. Injecting the second material further includes injecting the second material into the mold at the third locations of mold to form the third portion of the casing extending between the second portion of the casing and a third side of the casing, the third side of the casing extending between the first and the second sides of the casing. The second portion of the casing further is spaced-apart from the third side of the casing a fifth distance. The second bonding interface extends partially between the third side of the casing and a fourth side of the casing opposite the third side. The first and the second materials are injected based on a plurality of parameters such that a flow distribution of the first and the second materials in the mold forms the first and the second bonding interfaces.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
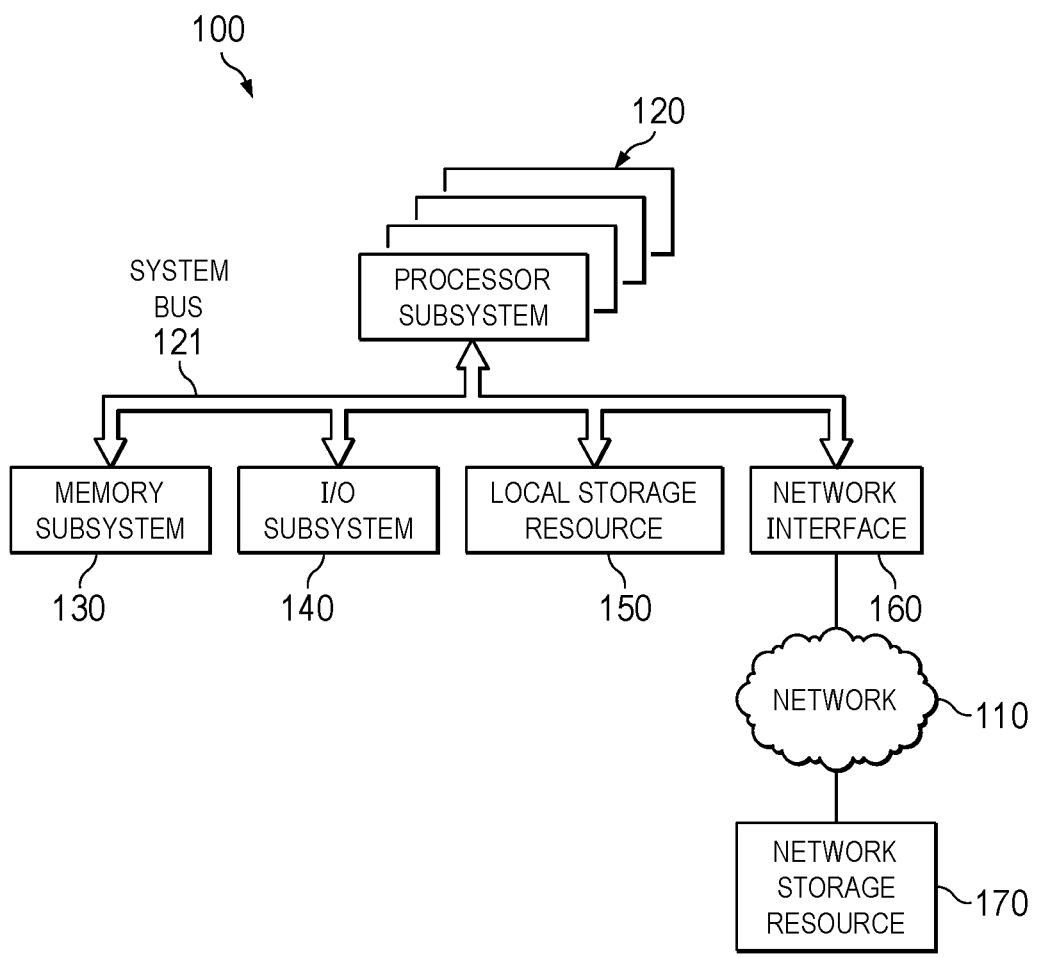
FIG. 1 is a block diagram of selected elements of an embodiment of an information handling system.

This disclosure discusses methods and systems for dual area bi-injection molding, and in particular, dual area bi-injection molding for forming a casing of an information handling system. In short, a dual area bi-injection process can bus used for forming the casing, including, forming multiple antenna windows of the casing at substantially a same time.

Specifically, this disclosure discusses a system and a method for forming a casing of an information handling system using dual area bi-injection, the method including injecting a first material into a mold: i) at one or more first locations of the mold to form a first portion of a casing of an information handling system, the first portion extending from a first side of the casing at least first distance, and ii) at one or more second locations of the mold to form a second portion of the casing of the information handling system, the second portion extending from a second side of the casing at least a second distance, the first side opposite to the second side; and injecting a second material into the mold at one or more third locations of the mold to form a third portion of the casing of the information handling system, the third portion between the first portion and the second portion; wherein injection of the first material and the second material into the mold is done concurrently, wherein injection of the first and the second material into the mold forms a first bonding interface and a second bonding interface between the first material and the second material such that the second material is excluded from ingression to the first portion and the second portion of the casing.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-10 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
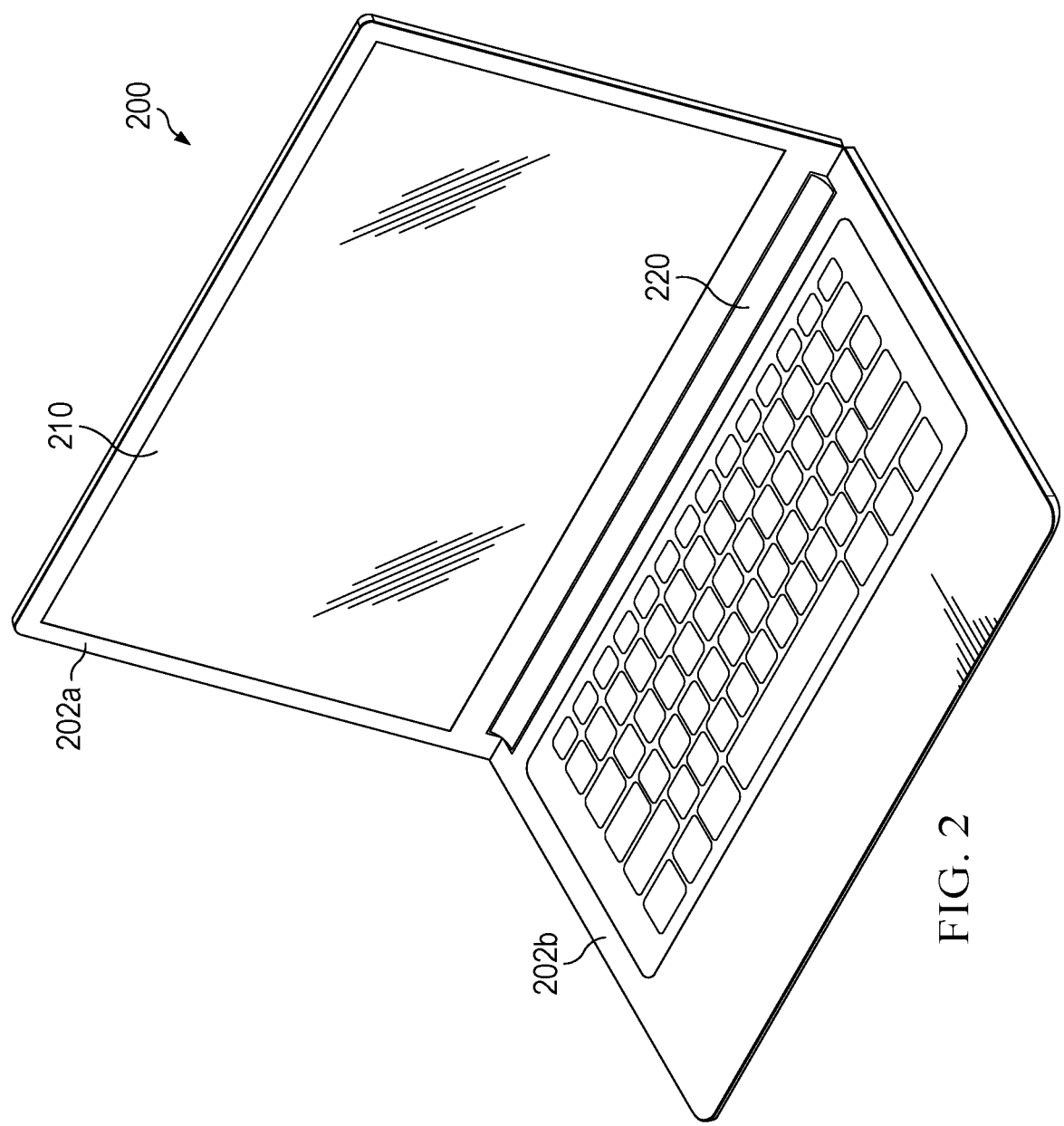
FIG. 2 illustrates a perspective view of an information handling system.

Turning to FIG. 2, FIG. 2 illustrates an information handling system 200. The information handling system 200 can include a first body 202a and a second body 202b (collectively referred to as bodies 202). The first body 202a can include a display 210. A hinge 220 can couple the first body 202a to the second body 220b. In some examples, the information handling system 202 is similar to, or includes, the information handling system 100 of FIG. 1.

Figure 3:
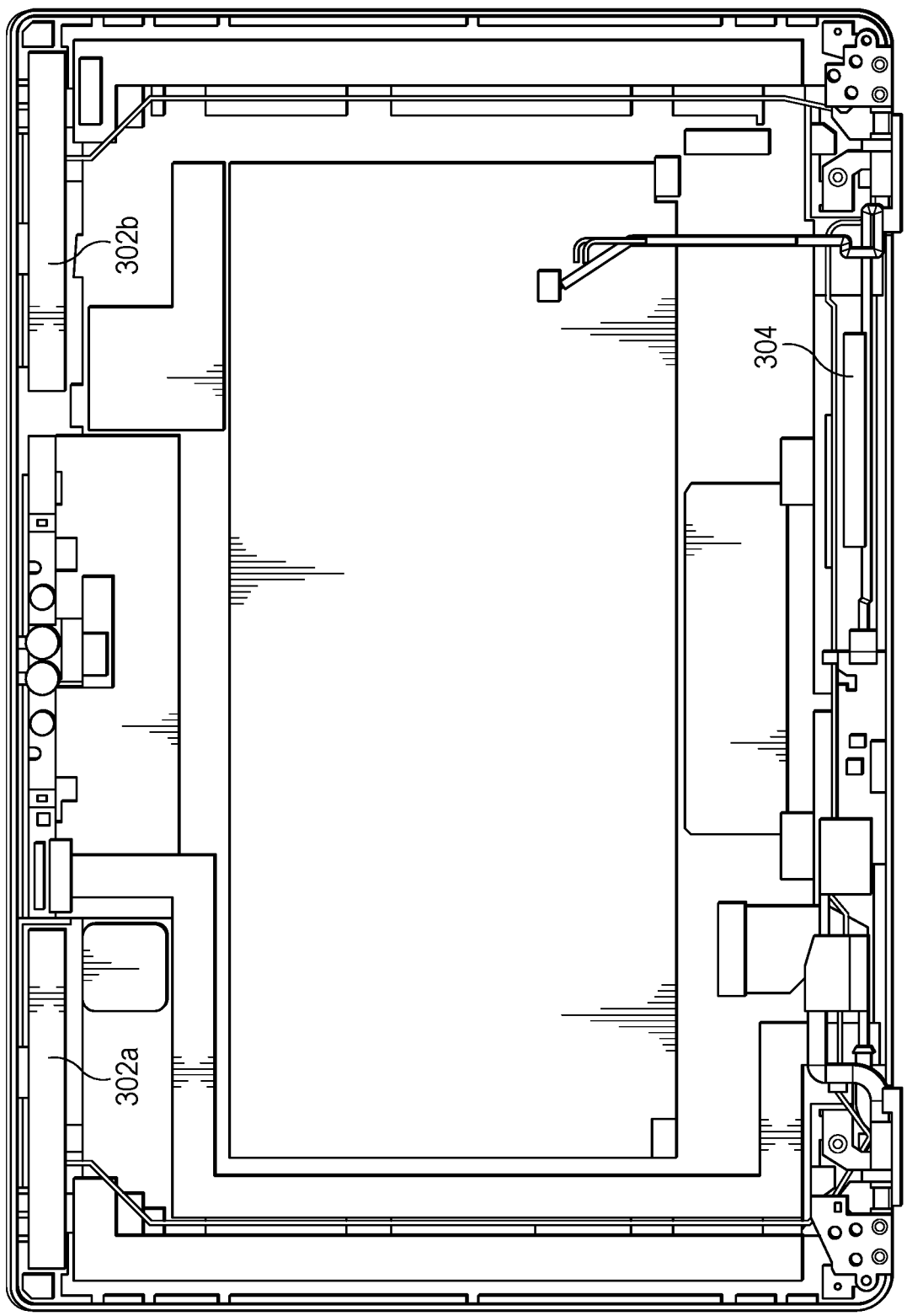
FIG. 3 is a top down cross-sectional view of the information handling system.

FIG. 3 is a top down cross-sectional view 300 of the information handling system 200, and in particular, the first body 202a. The first body 202a can include first antennas 302a, 302b (collectively referred to as first antennas 302) and a second antenna 304. The antennas 302, 304 can include any type of radio frequency (RF) antenna, such as 4G, 5G, and/or LAN.

In short, an injection system can form a casing of the information handling system 200, including utilizing a dual area bi-injection process for forming multiple antenna windows of the casing at substantially a same time.

Figure 4:
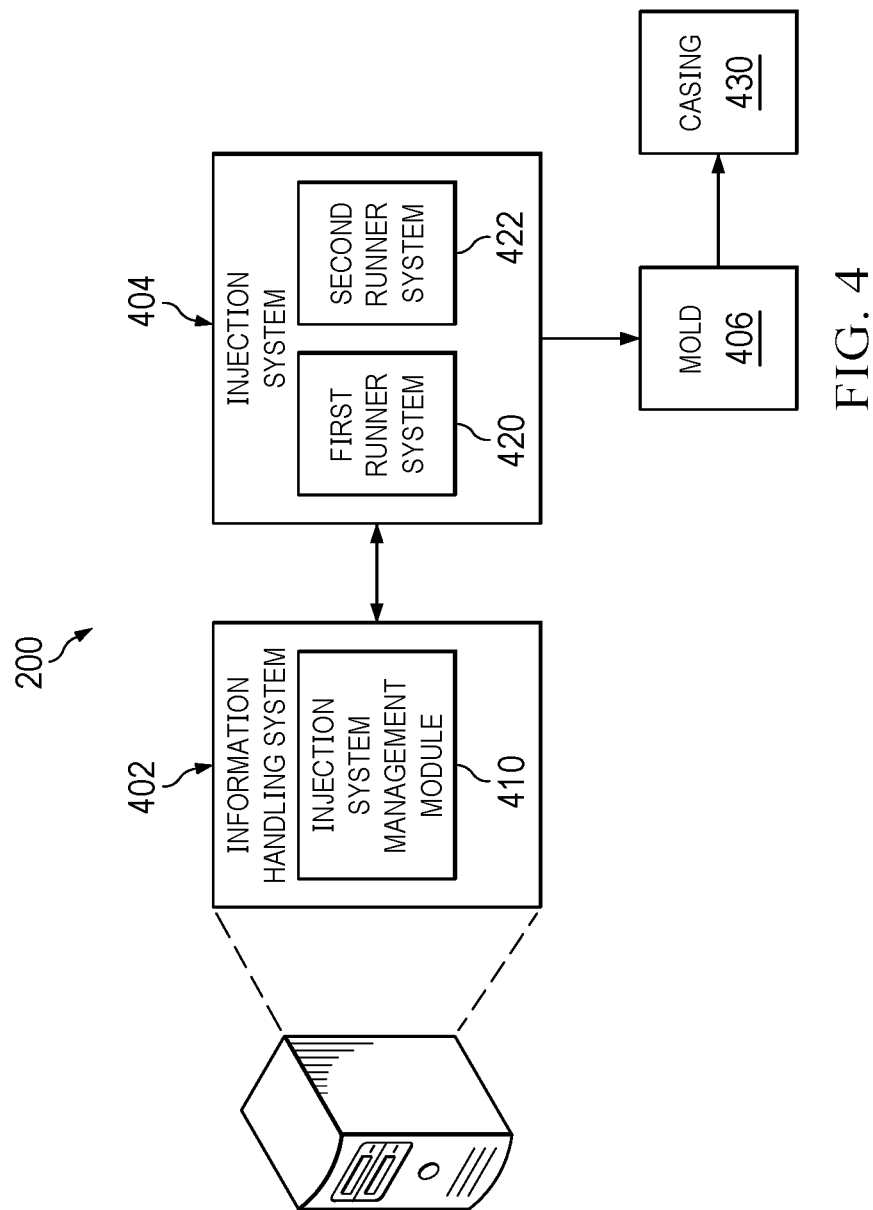
FIG. 4 is a block diagram of an injection system environment.

Turning to FIG. 4, FIG. 4 illustrates an environment 400 including an information handling system 402, an injection system 404, and a mold 406. The information handling system 200 can include an injection system management module 410. The injection system 404 can include a first runner system 420 and a second runner system 422. The information handling system 402, and in particular the injection system management module 410, can be in communication with the injection system 404. The injection system management module 410 can provide instructions/directions to the injection system 404, for example, instructions/directions in regard to injection of materials into the mold 406 to form the casing 430, described further herein.

The injection system 404 can form the casing 430 for the information handling system 200, e.g., the casing 430 that forms the first body 202a and/or the second body 202b, described further herein.

Figure 5:
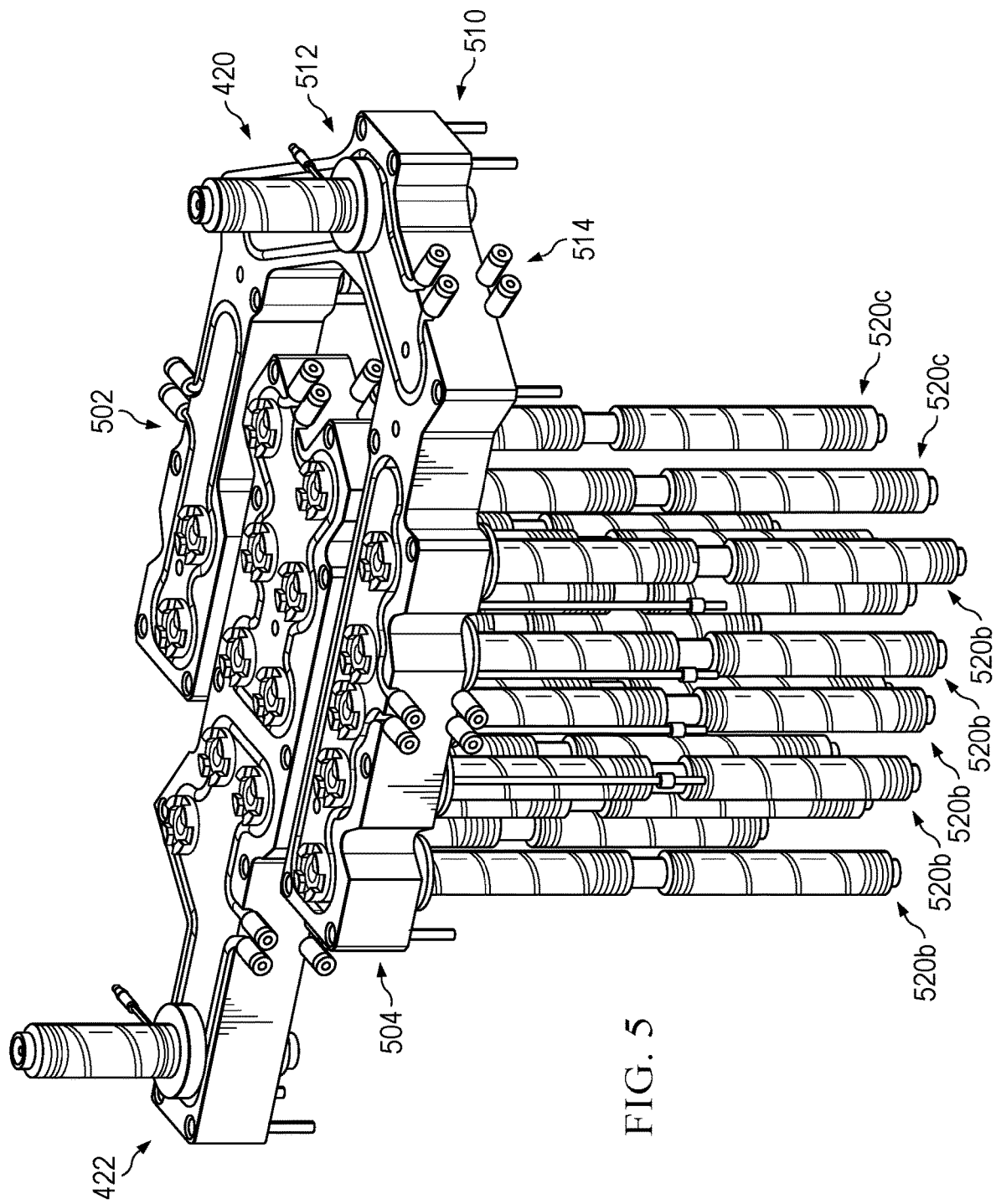
FIG. 5 is a perspective view of an injection system of the injection system environment.
Figure 6:
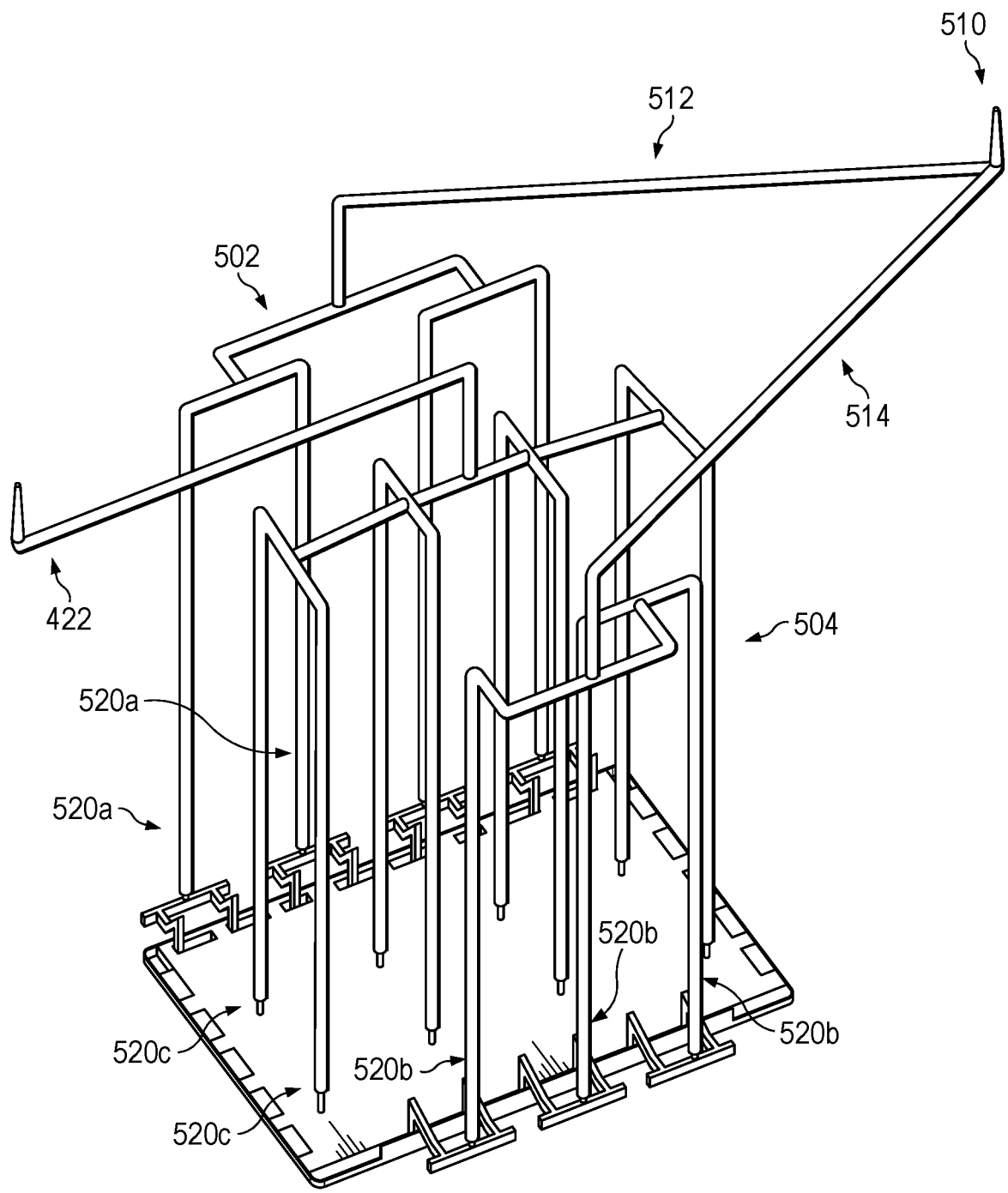
FIG. 6 is a perspective wireframe view of the injection system.
Figure 7:
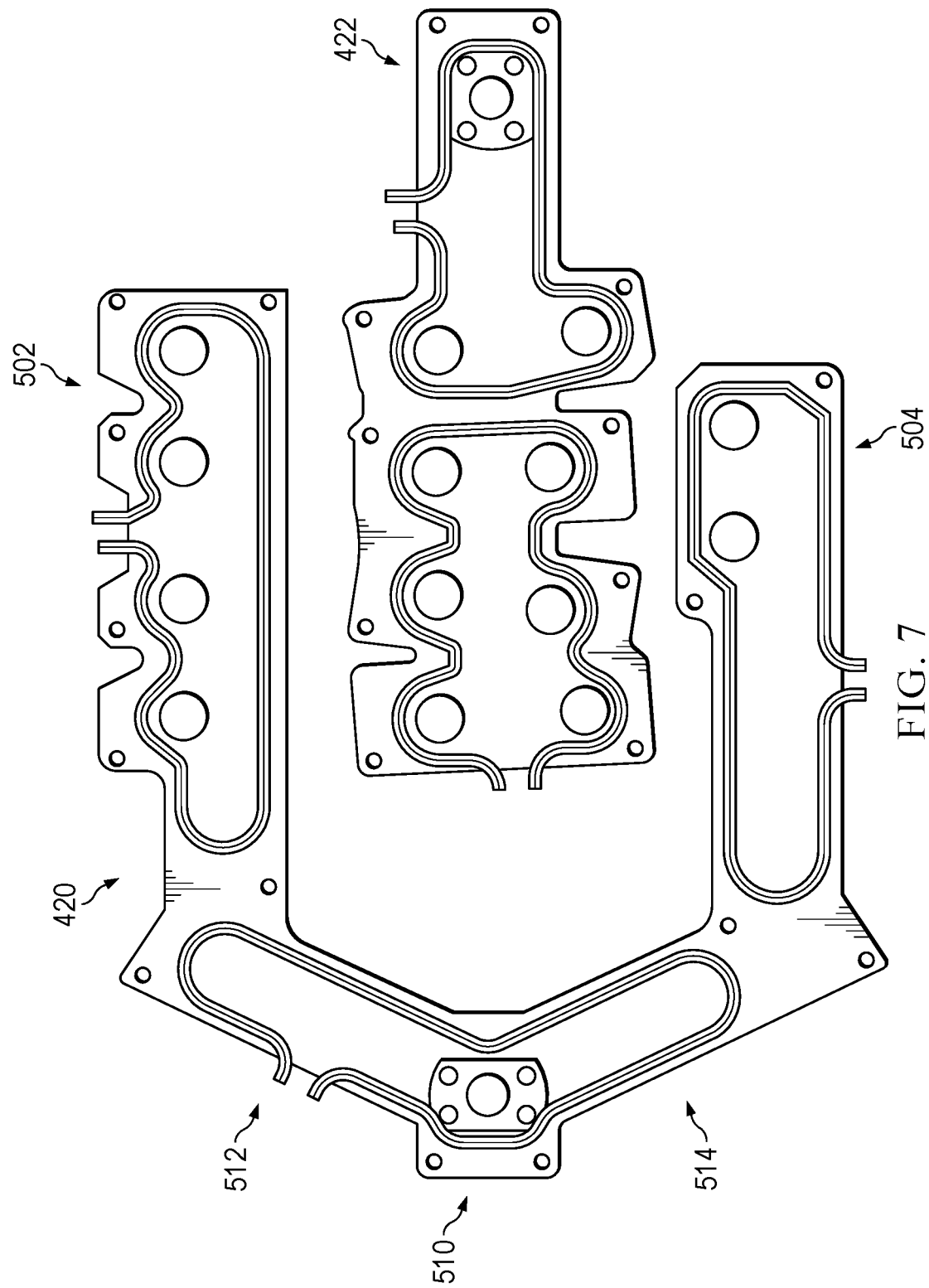
FIG. 7 is a top down wireframe view of the injection system.

FIGS. 5-7 illustrate the injection system 404 for forming the casing 430 of the information handling system 200. Specifically, FIG. 5 is a perspective view of the injection system 404; FIG. 6 is a perspective wireframe view of the injection system 404; and FIG. 7 is a top down wireframe view of the injection system 404.

The first runner system 420 includes a first branch runner 502 and a second branch runner 504. The first runner system 420 can further included a main runner 510 connected between the first branch runner 502 and the second branch runner 504. The main runner 510 can include a first portion 512 connecting to the first branch runner 502. The main runner 510 can further include a second portion 514 connecting to the second branch runner 504. The first portion 512 can be positioned at an angle with respect to the second portion 514. In some examples, first portion 512 can be positioned at an angle of approximately 120 degrees with respect to the second portion 514.

The second runner system 422 can be positioned between the first branch runner 502 and the second branch runner 504.

Figure 8:
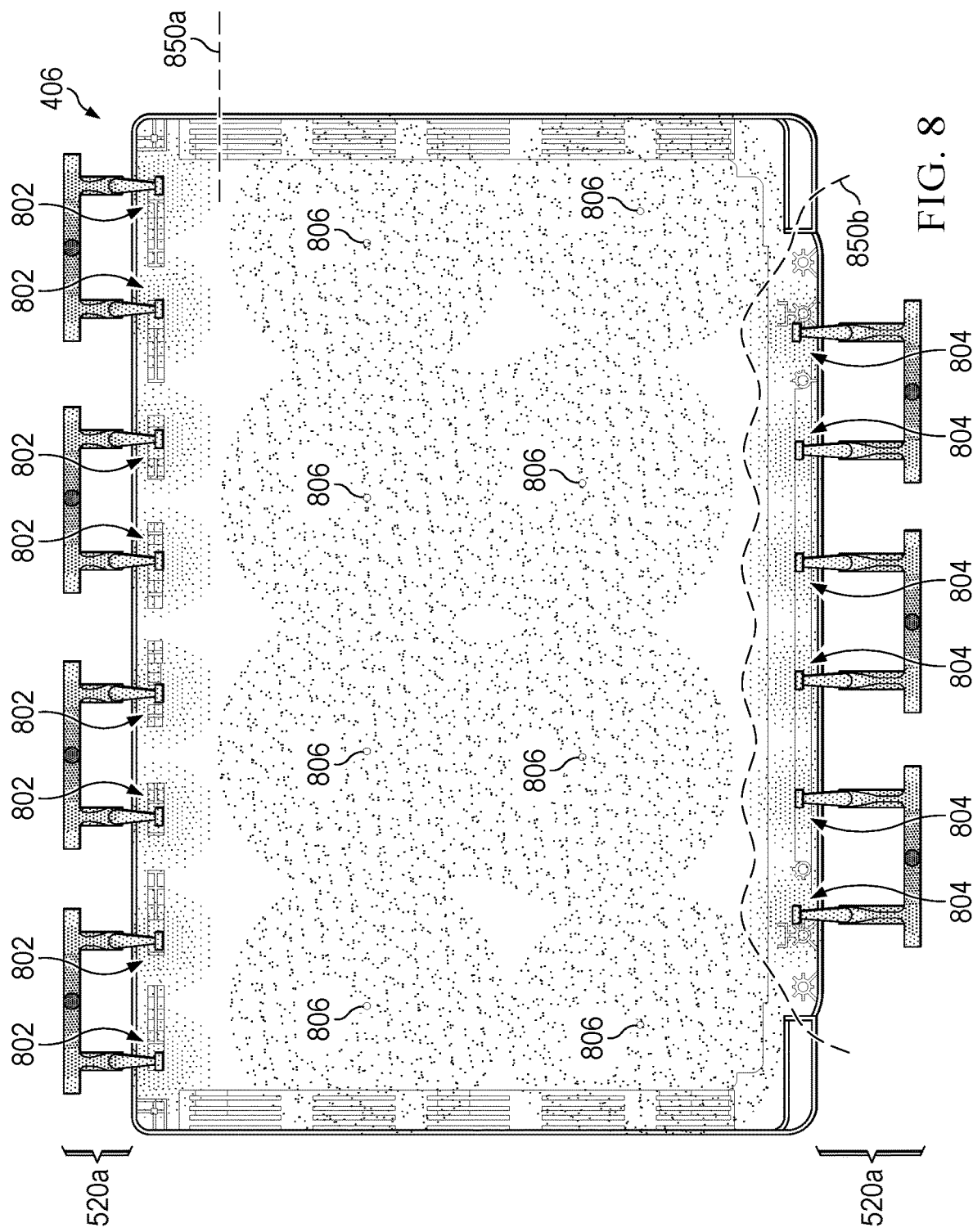
FIG. 8 is a top down view of the mold partially filled.

FIG. 8 illustrates a top down view of the mold 406 during formation of the casing 430. Referring to FIGS. 5-8, the first branch runner 502 can include a plurality of first gates 520a to inject a first material into the mold 406 at one more first locations 802 of the mold 406. In short, the casing 430 can be formed from the mold 406. The second branch runner 504 can include a plurality of second gates 520b to inject the first material into the mold 406 at one or more second locations 804 of the mold 406.

The second runner system 422 can include a plurality of third gates 520c to inject a second material into the mold 406 at one or more third locations 806 of the mold 406.

Referring to FIGS. 4, 5, and 8 when i) the first gates 520a inject the first material into the mold 406 at the first locations 802 of the mold 406, ii) the second gates 520b inject the first material into the mold 406 at the second locations 804 of the mold 406, and iii) the third gates 550c inject the second material into the mold 406 at the third locations 806 of the mold 406, a first bonding interface 850a and a second bonding interface 850b are formed between the first material and the second material. In some examples, the first gates 520a inject the first material into the mold 406 at the first locations 802 of the mold 406, ii) the second gates 520b inject the first material into the mold 406 at the second locations 804 of the mold 406, and iii) the third gates 550c inject the second material into the mold 406 at the third locations 806 of the mold 406 concurrently, or substantially currently.

Figure 9:
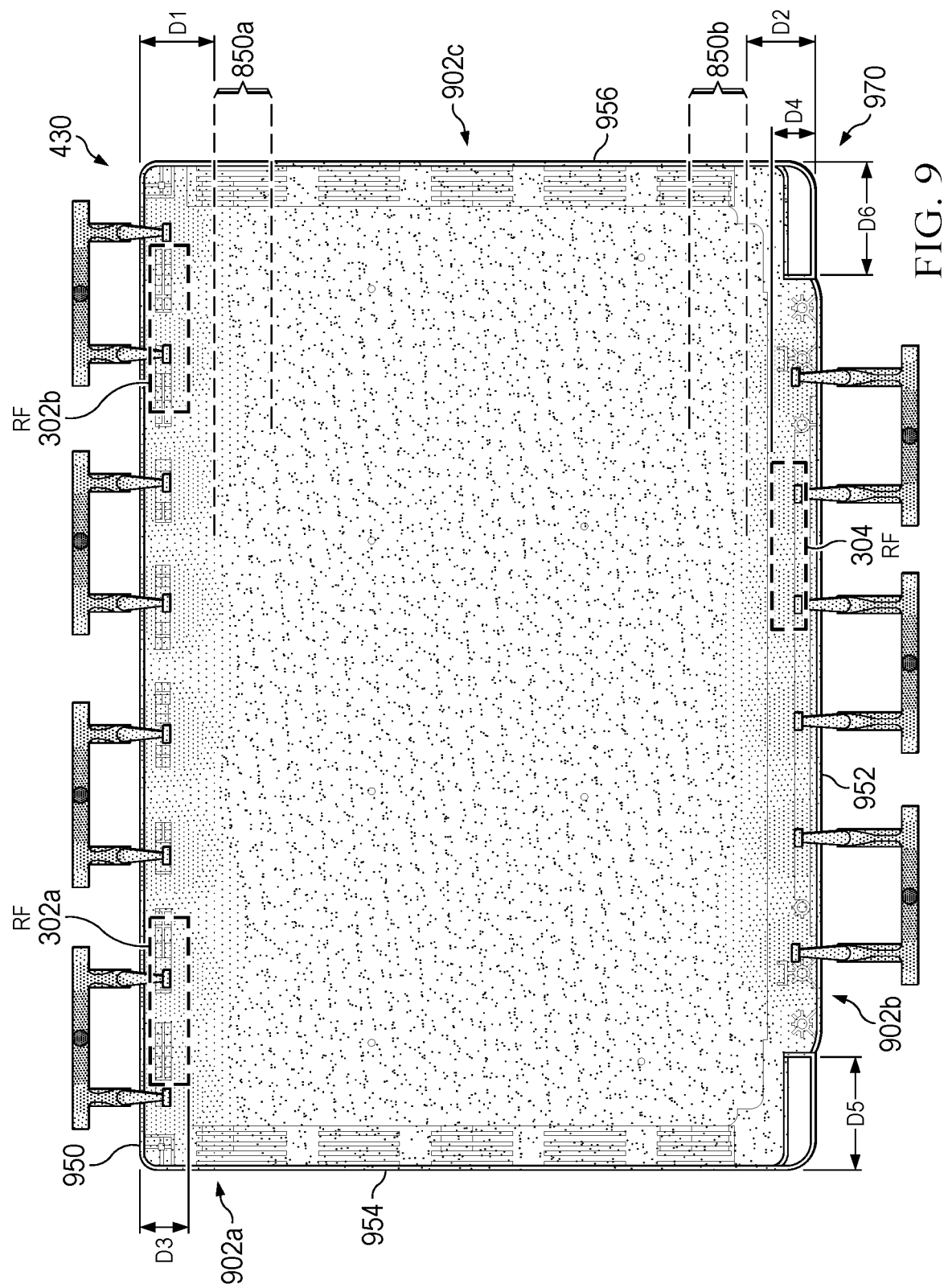
FIG. 9 is a top down view of the mold completely filled.
Figure 10:
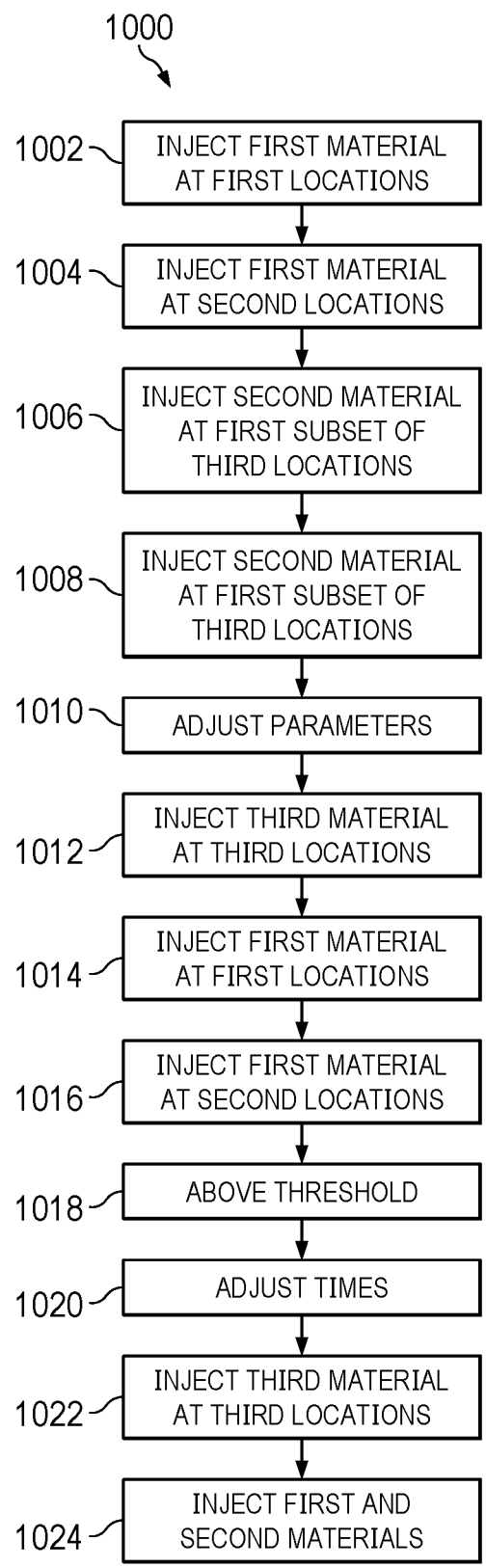
FIG. 10 illustrates a method for forming the casing using the injection system.

FIG. 9 illustrates a top down view of the mold 406 after formation of the casing 430. Referring to FIGS. 4, 5, and 9, when the first gates 520a inject the first material into the mold 406 at the first locations 802 of the mold 406, a first portion 902a of the casing 430 is formed. The first portion 902a of the casing 430 extends from a first side 950 of the casing 430 a first distance D1. In some examples, the first distance D1 is approximately 23 millimeters.

The first portion 902a of the casing 330 is in superimposition with the first antennas 302. A boundary of the first antennas 302 is a third distance D3 from the first side 950. In some examples, the first distance D1 is greater than the third distance D3. In some examples, the third distance D3 is between 25 and 30 millimeters.

In some examples, the first portion 902a of the casing 430 is in superimposition with the first antennas 302. In some examples, the first material (of the first portion 902a) is non-conductive. In some examples, the first material (of the first portion 902a) is a glass fiber reinforced plastic (GRFP). For example, the GRFP is polycarbonate (PC) plus 50% glass fiber (GF). For example, the GRFP is PC plus 50% GF with 30%-70% post-consumer resin (PCR).

To that end, the first material allows the first portion 902a of the casing 430 to be implemented as a first antenna window for the first antennas 302. Specifically, the first material allows the first portion 902a of the casing 430 to be implemented as the first antenna window for the first antennas 302 such that the first antenna window allows the first antennas 302 to radiate and receive signals.

When the second gates 520b inject the first material into the mold 406 at the second locations 804 of the mold 406, a second portion 902b of the casing 430 is formed. The second portion 902b of the casing 430 extends from a second side 952 of the casing 430 a second distance D2. The second side 952 is opposite to the first side 950. In some examples, the second distance D1 is approximately 23 millimeters.

The second portion 902b of the casing 330 is in superimposition with the second antenna 304. A boundary of the second antennas 304 is a fourth distance D4 from the second side 952. In some examples, the second distance D2 is greater than the fourth distance D4. In some examples, the fourth distance D4 is between 25 and 30 millimeters.

In some examples, the second portion 902b of the casing 430 is in superimposition with the second antenna 302b. In some examples, the first material (of the second portion 902b) is non-conductive. In some examples, the first material (of the second portion 902b) is a glass fiber reinforced plastic (GRFP). For example, the GRFP is polycarbonate (PC) plus 50% glass fiber (GF). For example, the GRFP is PC plus 50% GF with 30%-70% post-consumer resin (PCR).

To that end, the first material allows the second portion 902b of the casing 430 to be implemented as a second antenna window for the second antenna 304. Specifically, the first material allows the second portion 902b of the casing 430 to be implemented as the second antenna window for the second antenna 304 such that the second antenna window allows the second antenna 304 to radiate and receive signals.

When the third gates 520c inject the second material into the mold 406 at the third locations 806 of the mold 406, a third portion 902c of the casing 430 is formed. In some examples, the third portion 902c of the casing 430 extends between the first portion 902a and the second portion 902b. In some examples, the third portion 902c of the casing 430 extends between the first bonding interface 850a and the second bonding interface 850b.

In some examples, the second material (of the third portion 902c) is conductive. In some examples, the second material (of the third portion 902c) is a carbon fiber reinforced plastic (CRFP). For example, the CRFP is polycarbonate (PC) plus 50% carbon fiber (CF). For example, the GRFP is PC plus 20% CF with 30%-70% post-consumer resin (PCR).

In some examples, the first bonding interface 850a and the second bonding interface 850b facilitate exclusion of ingression of the second material to the first portion 902a and the second portion 902b of the casing 430. That is, the first bonding interface 850a is defined between the first portion 902a of the casing 430 and the third portion 902c of the casing 430; and the second bonding interface 850b is defined between the second portion 902b of the casing 430 and the third portion 902c of the casing 430. The first bonding interface 850a and the second bonding interface 805b can include a composite of the first and the second materials. To that end, the first bonding interface 850a acts/serves as a "buffer" zone such that the first portion 902a of the casing 430 is excluded from ingression of the second material. Similarly, the second bonding interface 850b acts/serves as a "buffer" zone such that the second portion 902b of the casing 430 is excluded from ingression of the second material.

In some examples, the first and the second material are chosen based on one or more factors, such as resin combability between the first and the second material. In some examples, the resins of the first and the second material have the same, or substantially the same, shrinkage rate. In some examples, the resins of the first and the second material have the same, or substantially the same, flow viscosity. In some examples, the resins of the first and the second material have the same, or substantially the same, painting mask capacity. In some examples, the second material includes PC plus 20% CF, with a density of 1.3. In some examples, the first material includes PC plus 50% GF, with a density of 1.6. In some examples, the first material and the second material are 30%-70% PCR.

In some examples, the casing 430 includes a third side 954 and a fourth side 956. The third side 954 and the fourth side 956 are both positioned between the first side 950 and the second side 952. The third side 954 is opposite to the fourth side 956. To that end, when the third gates 520c inject the second material into the mold 406 at the third locations 806 of the mold 406, the third portion 902c of the casing 430 is formed to extend between the second portion 902b of the casing 430 and the third side 954 of the casing and between the second portion 902b of the casing 430 and the fourth side 956 of the casing 430. That is, proximate to a second end 970 of the casing 430, the third portion 902c of the casing 430 extends between the second portion 902b of the casing 430 and the third side 954 of the casing 430; and further extends between the second portion 902b of the casing 430 and the fourth side 956 of the casing 430.

In some examples, the second portion 902b of the casing 430 is spaced-apart from the third side 954 of the casing 430 a fifth distance D5; and the second portion 902b of the casing 430 is spaced-apart from the fourth side 956 of the casing 430 a sixth distance D6. To that end, the second bonding interface 850b extends partially between the third side 954 of the casing 430 and the fourth side 956 of the casing 430. That is, the second bonding interface 850b substantially surrounds the second portion 902b of the casing 430 along an entire (or substantially entire) perimeter of the second portion 902b such that ingression of the second material to the second portion 902b is prevented, and/or minimized. Similarly, the first bonding interface 850a substantially surrounds the first portion 902a of the casing 430 along an entire (or substantially entire) perimeter of the first portion 902a such that ingression of the second material to the first portion 902a is prevented, and/or minimized.

In some examples, i) the first gates 520a inject the first material into the mold 406 at the first locations 802 of the mold 406, ii) the second gates 520b inject the first material into the mold 406 at the second locations 804 of the mold 406, and iii) the third gates 550c inject the second material into the mold 406 at the third locations 806 of the mold 406 based on a plurality of parameters such that a flow distribution of the first and the second materials in the mold 406 forms the first bonding interface 850a and the second bonding interface 850b. The parameters can include injection time (or timing), injection pressure, and injection length of time.

A method 1000 for forming the casing 430 using the injection system 404. The method 1000 may be performed by the information handling system 402, the injection system management module 410, and/or the injection system 404, and with reference to FIGS. 1-9. It is noted that certain operations described in method 1000 may be optional or may be rearranged in different embodiments.

The first gates 520a inject the first material into the mold 406 at the first locations 802 of the mold 406 without holding pressure, and for a time direction T1, at 1002. The second gates 520b inject the first material into the mold 406 at the second locations 804 of the mold 406 without holding pressure, and for a time direction T2, at 1004. The third gates 550c inject the second material into the mold 406 at a subset of the third locations 806 of the mold 406 proximate to the first locations 802 without holding pressure, and for a time direction T3, at 1006. The third gates 550c inject the second material into the mold 406 at a subset of the third locations 806 of the mold 406 proximate to the second locations 804 without holding pressure, and for a time direction T4, at 1008. The parameters of the injection system 404 for the injection of the first and the second material can be adjusted, at 1010. The third gates 550c inject the second material into the mold 406 at the third locations 806 of the mold 406 at a same time without holding pressure, and for a time direction T5, at 1012. The first gates 520a inject the first material into the mold 406 at the first locations 802 of the mold 406 for a time T6 and without holding pressure, at 1014. In some examples, the time T6 is the difference between T1 and T5. The second gates 520b inject the first material into the mold 406 at the second locations 804 of the mold 406 for a time T7 and without holding pressure, at 1016. In some examples, the time T7 is the difference between time T2 and T5. Determine that an amount of the mold 406 is filled by the first material and the second material is below a threshold, at 1018. In some examples, the threshold amount is 95%. When the amount of the mold 406 that is filled by the first material and the second material is less than the threshold, T1, T2, and T5 are adjusted to meet the threshold, 1020. The third gates 550c inject the second material into the mold 406 at the third locations 806 of the mold 406 with holding pressure, at 1022. The first gates 520a inject the first material into the mold 406 at the first locations 802 of the mold 406 and the second gates 520b inject the first material into the mold 406 at the second locations 804 of the mold 406, with holding pressure, at 104. In some examples, the holding pressure for injection of the first material is greater than the holding pressure for injection of the second material.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of forming a casing of an information handling system using dual area bi-injection, the method comprising:
   injecting a first material into a mold:
      i) at one or more first locations of the mold to form a first portion of a casing of an information handling system, the first portion extending from a first side of the casing at least first distance, and
      ii) at one or more second locations of the mold to form a second portion of the casing of the information handling system, the second portion extending from a second side of the casing at least a second distance, the first side opposite to the second side; and
   injecting a second material into the mold at one or more third locations of the mold to form a third portion of the casing of the information handling system, the third portion between the first portion and the second portion;
   wherein injection of the first material and the second material into the mold is done concurrently,
   wherein injection of the first and the second material into the mold forms a first bonding interface and a second bonding interface between the first material and the second material such that the second material is excluded from ingression to the first portion and the second portion of the casing.

2. The method of claim 1, wherein the first portion of the casing is in superimposition with a first antenna, and the second portion of the casing is in superimposition with a second antenna.

3. The method of claim 2, wherein the first material is non-conductive and the second material is conductive.

4. The method of claim 3, wherein the first material is glass fiber reinforced plastic and the second material is carbon fiber reinforced plastic.

5. The method of claim 4, wherein the first portion of the casing forms a first antenna window for the first antenna, and the second portion of the casing forms a second antenna window for the second antenna.

6. The method of claim 2, wherein a boundary of the first antenna is a third distance from the first side, wherein the first distance is greater than the third distance, and wherein a boundary of the second antenna is a fourth distance from the second side, wherein the second distance is greater than the fourth distance.

7. The method of claim 1, wherein the first bonding interface is defined between the first portion of the casing and the third portion of the casing, the first bonding interface including a composite of the first and the second materials, and wherein the second bonding interface is defined between the second portion of the casing and the third portion of the casing, the second bonding interface including a composite of the first and the second materials.

8. The method of claim 7, wherein injecting the second material further includes injecting the second material into the mold at the third locations of mold to form the third portion of the casing extending between the second portion of the casing and a third side of the casing, the third side of the casing extending between the first and the second sides of the casing.

9. The method of claim 8, wherein the second portion of the casing further is spaced-apart from the third side of the casing a fifth distance.

10. The method of claim 9, wherein the second bonding interface extends partially between the third side of the casing and a fourth side of the casing opposite the third side.

11. The method of claim 1, wherein the first and the second materials are injected based on a plurality of parameters such that a flow distribution of the first and the second materials in the mold forms the first and the second bonding interfaces.

* * * * *